US011975759B2

(12) United States Patent
Zhang et al.

(10) Patent No.: US 11,975,759 B2
(45) Date of Patent: May 7, 2024

(54) SELF-LEARNING-BASED INTERPRETATION OF DRIVER'S INTENT FOR EVASIVE STEERING

(71) Applicant: APTIV TECHNOLOGIES LIMITED, St. Michael (BB)

(72) Inventors: Guoguang Zhang, Westfield, IN (US); Walter K. Kosiak, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 184 days.

(21) Appl. No.: 17/487,118

(22) Filed: Sep. 28, 2021

(65) Prior Publication Data

US 2023/0099555 A1 Mar. 30, 2023

(51) Int. Cl.
*B62D 15/02* (2006.01)
(52) U.S. Cl.
CPC ..... *B62D 15/0265* (2013.01); *B62D 15/0255* (2013.01)
(58) Field of Classification Search
CPC ...... B60W 10/20; B60W 30/09; B60W 10/18; B60W 10/184; B60W 2520/10; B60W 2520/125; B60W 2540/18; B60W 30/0953; B60W 2420/52; B60W 2520/14; B60W 2520/28; B60W 2554/00
See application file for complete search history.

(56) References Cited

U.S. PATENT DOCUMENTS

| 4,509,040 | A  | * | 4/1985  | Seko ................. | B60K 28/066 340/576 |
| 8,255,133 | B2 | * | 8/2012  | Ahn .................. | F16H 61/12 701/64 |
| 8,519,853 | B2 | * | 8/2013  | Eskandarian ......... | A61B 5/6887 180/272 |
| 8,593,288 | B2 | * | 11/2013 | Schmitz .............. | G08B 21/06 340/576 |
| 8,742,936 | B2 | * | 6/2014  | Galley ............... | B60K 28/066 340/576 |
| 10,065,637 | B2 | * | 9/2018 | Arndt ................ | B60W 10/184 |
| 10,065,651 | B2 | * | 9/2018 | Kim .................. | B60W 50/14 |
| 2013/0272457 | A1 | * | 10/2013 | Ilie ................ | H04L 1/0036 375/340 |

(Continued)

FOREIGN PATENT DOCUMENTS

CN 101579232 B * 2/2013 ........... A61B 5/0492
JP 2004500279 A * 1/2004

*Primary Examiner* — Redhwan K Mawari
(74) *Attorney, Agent, or Firm* — Miller Johnson

(57) ABSTRACT

Evasive steering assist (ESA) systems and methods for a vehicle utilize a set of vehicle perception systems configured to detect an object in a path of the vehicle, a driver interface configured to receive steering input from a driver of the vehicle via a steering system of the vehicle, a set of steering sensors configured to measure a set of steering parameters, and a controller configured to determine a set of driver-specific threshold values for the set of steering parameters, compare the measured set of steering parameters and the set of driver-specific threshold values to determine whether to engage/enable an ESA feature of the vehicle, and in response to engaging/enabling the ESA feature of the vehicle, command the steering system to assist the driver in avoiding a collision with the detected object.

20 Claims, 3 Drawing Sheets

(56) References Cited

U.S. PATENT DOCUMENTS

| | | | | |
|---|---|---|---|---|
| 2014/0067252 A1* | 3/2014 | Knoop | ............... | G08G 1/167 |
| | | | | 701/400 |
| 2014/0303845 A1* | 10/2014 | Hartmann | ............ | B60W 10/20 |
| | | | | 701/41 |
| 2015/0314782 A1* | 11/2015 | Haeussler | ............ | B60W 10/20 |
| | | | | 701/48 |
| 2016/0280265 A1* | 9/2016 | Hass | ............... | B62D 15/0265 |
| 2016/0339910 A1* | 11/2016 | Jonasson | ............ | B60W 10/20 |
| 2017/0148327 A1* | 5/2017 | Sim | ............... | G08G 1/167 |

* cited by examiner

SELF-LEARNING-BASED INTERPRETATION OF DRIVER'S INTENT FOR EVASIVE STEERING

FIELD

The present disclosure generally relates to vehicle advanced driver assistance systems (ADAS) and, more particularly, to a self-learning-based interpretation of a driver's intent for evasive steering.

BACKGROUND

Some traffic collisions involve a vehicle colliding with a moving or non-moving obstacle in front of it. This obstacle could be another vehicle, road debris, or the like. The collision could occur due the driver failing to provide an adequate amount of evasive steering torque (e.g., via the steering wheel). For example, the driver may not be paying attention to the road. Some conventional vehicle advanced driver assistance (ADAS) systems provide collision avoidance assistance. However, these conventional ADAS systems are generic and not driver-specific (e.g., calibrated) and thus their performance may be insufficient in certain scenarios thereby still resulting in a collision of the vehicle with the obstacle. As a result, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an evasive steering assist (ESA) system for a vehicle is presented. In one exemplary implementation, the ESA system comprises a set of vehicle perception systems configured to detect an object in a path of the vehicle, a driver interface configured to receive steering input from a driver of the vehicle via a steering system of the vehicle, a set of steering sensors configured to measure a set of steering parameters, and a controller configured to determine a set of driver-specific threshold values for the set of steering parameters, compare the measured set of steering parameters and the set of driver-specific threshold values to determine whether to engage/enable an ESA feature of the vehicle, and in response to engaging/enabling the ESA feature of the vehicle, command the steering system to assist the driver in avoiding a collision with the detected object.

In some implementations, the set of steering parameters comprises (i) steering angular speed, (ii) steering column torque, (iii) lateral acceleration, and (iv) lateral jerk. In some implementations, the controller is configured to initially determine the set of driver-specific thresholds for the set of steering parameters by multiplying baseline or default threshold values by respective calibratable gains. In some implementations, the controller is configured to update the set of driver-specific thresholds for the set of steering parameters by multiplying root-mean-square (RMS) values of the measured set of steering parameters by the respective calibratable gains. In some implementations, the controller is configured to update the set of driver-specific thresholds in response to a highway overtake maneuver. In some implementations, the controller is configured to initiate the highway overtake maneuver during a safe highway operation scenario. In some implementations, the set of perception sensors comprises at least one of (i) a front-facing camera, (ii) a radio detection and ranging (RADAR) system, (iii) a light detection and ranging (LIDAR) system, (iv) a maps/global positioning satellite (GPS) system, and (v) a vehicle speed sensor.

According to another aspect of the present disclosure, an ESA method for a vehicle is presented. In one exemplary implementation, the method comprises providing a set of vehicle perception systems configured to detect an object in a path of the vehicle, providing a driver interface configured to receive steering input from a driver of the vehicle via a steering system of the vehicle, providing a set of steering sensors configured to measure a set of steering parameters, determining, by a controller of the vehicle, a set of driver-specific threshold values for the set of steering parameters, comparing, by the controller, the measured set of steering parameters and the set of driver-specific threshold values to determine whether to engage/enable an ESA feature of the vehicle, and in response to engaging/enabling the ESA feature of the vehicle, commanding, by the controller, the steering system to assist the driver in avoiding a collision with the detected object.

In some implementations, the set of steering parameters comprises (i) steering angular speed, (ii) steering column torque, (iii) lateral acceleration, and (iv) lateral jerk. In some implementations, the controller is configured to initially determine the set of driver-specific thresholds for the set of steering parameters by multiplying baseline or default threshold values by respective calibratable gains. In some implementations, the controller is configured to update the set of driver-specific thresholds for the set of steering parameters by multiplying RMS values of the measured set of steering parameters by the respective calibratable gains. In some implementations, the controller is configured to update the set of driver-specific thresholds in response to a highway overtake maneuver. In some implementations, the controller is configured to initiate the highway overtake maneuver during a safe highway operation scenario. In some implementations, the set of perception sensors comprises at least one of (i) a front-facing camera, (ii) a RADAR system, (iii) a LIDAR system, (iv) a maps/GPS system, and (v) a vehicle speed sensor.

According to yet another aspect of the present disclosure, an ESA system for a vehicle is presented. In one exemplary implementation, the ESA system comprises a set of vehicle perception means for detecting an object in a path of the vehicle, a driver interface means for receiving steering input from a driver of the vehicle via a steering system means of the vehicle, a set of steering sensor means for measuring a set of steering parameters, and a controller means for determining a set of driver-specific threshold values for the set of steering parameters, comparing the measured set of steering parameters and the set of driver-specific threshold values to determine whether to engage/enable an ESA feature of the vehicle, and in response to engaging/enabling the ESA feature of the vehicle, commanding the steering system means to assist the driver in avoiding a collision with the detected object.

In some implementations, the set of steering parameters comprises (i) steering angular speed, (ii) steering column torque, (iii) lateral acceleration, and (iv) lateral jerk. In some implementations, the controller means is for initially determining the set of driver-specific thresholds for the set of steering parameters by multiplying baseline or default threshold values by respective calibratable gains. In some implementations, the controller means is for updating the set of driver-specific thresholds for the set of steering parameters by multiplying RMS values of the measured set of steering parameters by the respective calibratable gains. In some implementations, the controller means is for updating the set of driver-specific thresholds in response to a highway overtake maneuver. In some implementations, the controller means is for initiating the highway overtake maneuver during a safe highway operation scenario.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, there exists an opportunity for improvement in the art of vehicle advanced driver assistance (ADAS) capable of high performance evasive steering assistance. Accordingly, systems and methods are presented for self-learning-based interpretation of a driver's intent to perform evasive steering assistance. These systems and method are configured to determine driver-specific parameter thresholds for determining whether or not to perform evasive steering assistance. Potential benefits of driver-specific (e.g., calibrated) evasive steering assistance can include improved driver acceptance and/or decreased annoyance with respect to the evasive steering assistance feature, which could prevent drivers from manually disabling the feature, thereby extending its operation and improving driver safety while operating the vehicle due to the mitigation or elimination of collisions.

Figure 1:
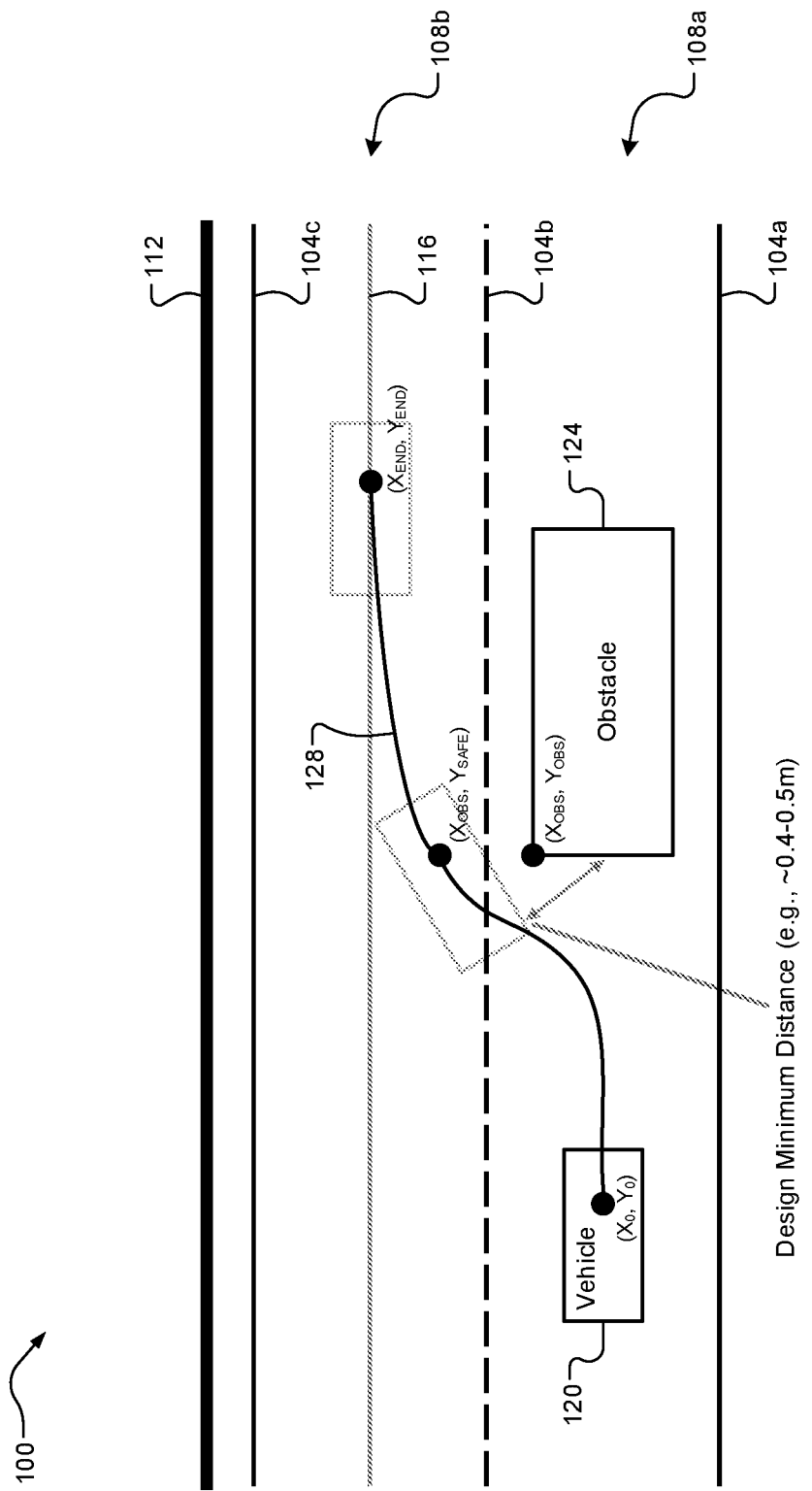
FIG. 1 is a diagram of an example vehicle evasive steering maneuver according to the principles of the present disclosure.

Referring now to FIG. 1, a diagram 100 of an example vehicle evasive steering maneuver according to the principles of the present disclosure is illustrated. As shown, lane lines 104a-104c define two lanes 108a-108b in the same direction of travel on one side of a divider 112. Line 116 represents a center line of lane 108b. As shown, a vehicle 120 is approaching an obstacle 124 which could be stationary (e.g., a stopped semi-truck) or moving at a slower speed that the vehicle 120 (e.g., another moving vehicle). To avoid a rear-end collision with the obstacle 124, the vehicle 120 performs an evasive steering procedure into lane 108b that also maintains a minimum distance (e.g., ~0.4-0.5 m) from the obstacle 124. It will be appreciated that these are merely example values that could vary depending on the vehicle 120, road/weather/traffic conditions, and vehicle/obstacle speeds. As shown, the vehicle 120 follows a spline path 128 from initial point $(X_0, Y_0)$ to intermediate avoidance point $(X_{OBS}, Y_{SAFE})$ (relative to the back left corner of the obstacle 124 $(X_{OBS}, Y_{OBS})$) to a final point $(X_{END}, Y_{END})$.

Figure 2:
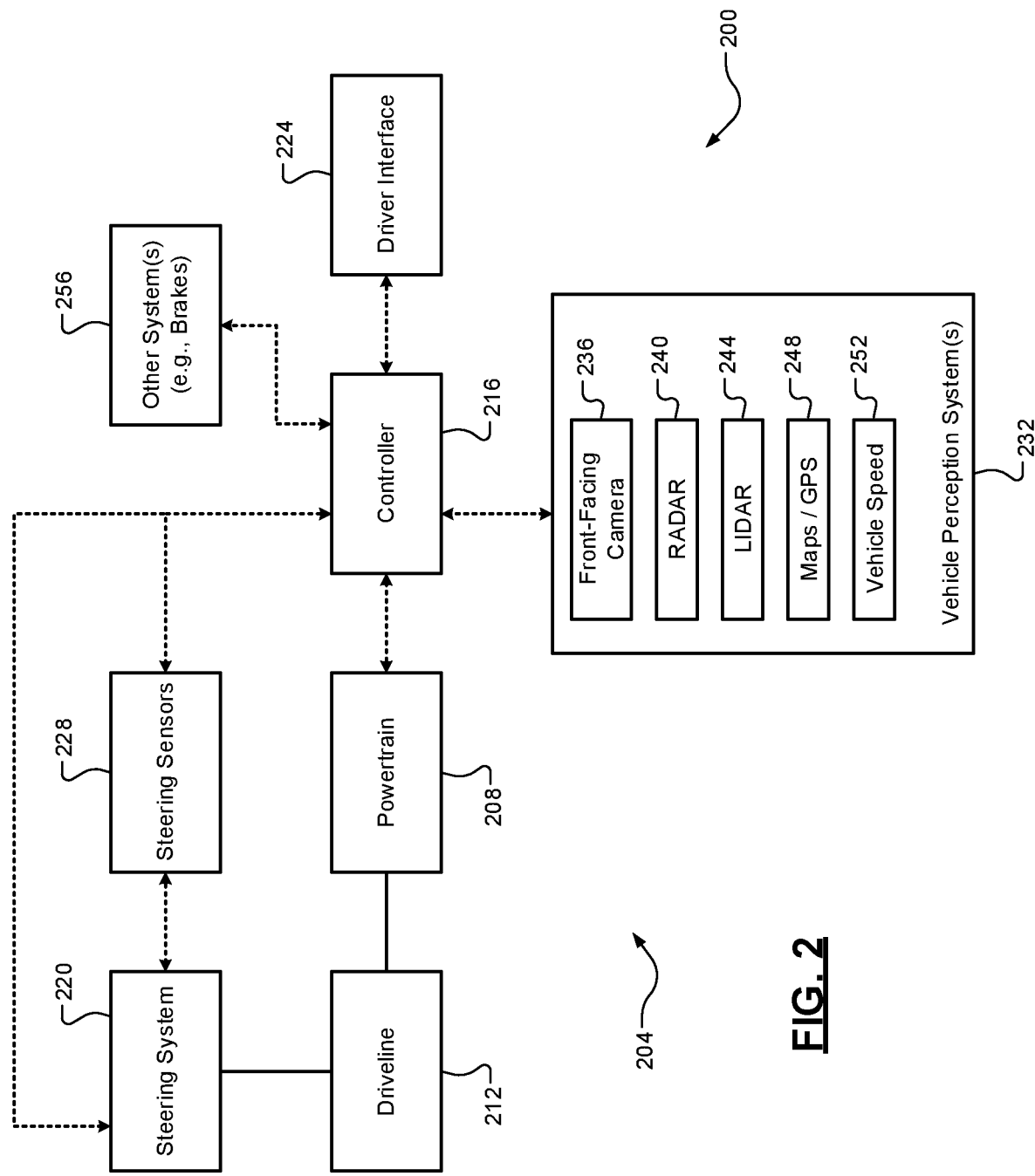
FIG. 2 is a functional block diagram of a vehicle having an example evasive steering assist (ESA) system according to the principles of the present disclosure.

Referring now to FIG. 2 and with continued reference to FIG. 1, a functional block diagram of a vehicle 200 having an example evasive steering assist (ESA) system 204 according to the principles of the present disclosure is illustrated. The vehicle 200 generally comprises a powertrain 208 (e.g., an engine, an electric motor, or some combination thereof in addition to a transmission) configured to generate and transfer drive torque to a driveline 212 for vehicle propulsion. A controller 216 controls operation of the vehicle 200, including controlling the powertrain 208 to generate a desired amount of drive torque (e.g., based on driver input via a driver interface 224, such as an accelerator pedal). It will be appreciated that the driver interface 224 includes other suitable components such as a steering wheel (not shown) that the driver manipulates to control steering of the vehicle 200 via a steering system 220 (e.g., one or more actuators). The controller 216 is also configured to perform at least a portion of the self-learning-based interpretation techniques of a driver's intent for evasive steering according to the present disclosure, which is discussed in greater detail below.

Based on extensive testing, it was determined that a few signals are particularly indicative of whether the driver has the intention to do evasive steering. These signals include steering angular rate, steering torque, lateral acceleration, and lateral jerk. These signals are generated by a set of one or more steering sensors 228. While these four signals/parameters are specially discussed herein, it will be appreciated that additional signals/parameters could also be monitored in an attempt to improve system accuracy/robustness. A threshold is determined for each signal. If all signals exceed their respective thresholds, it can be determined that the driver is trying to do an evasive steering and the ESA feature will engage and help the driver to complete the maneuver. During the aforementioned extensive testing, it was determined that these thresholds are also drive-dependent. For example, steering angular rate 30 degrees per second (°/s) could represent evasive steering intention for a conservative driver, but could also represent normal driving behavior for an aggressive driver.

In order to learn these driver-specific thresholds, an invasive learning maneuver could be performed. More specifically, a highway overtake maneuver could be performed to determine the driver's aggressiveness. While evasive steering is not a very common scenario, highway overtake is relatively common and thus will be less invasive or perceptible to the driver. Pre-defined (e.g., baseline) thresholds for different drivers could then be adjusted based on the learned driver aggressiveness. For example, c1-c4 can represent calibratable gains, and a good starting point can be: c1=c2=c3=c4=3. The learning algorithm can be extended to produce thresholds for different circumstances (e.g., based on data from weather/road condition, traffic, and driver state monitoring (DSM) systems of other system(s) 256). Non-limiting examples of these circumstances to account for include high friction road vs. slipper (snow/ice) surface, high traffic density vs. low traffic density, driver attentive vs. driver not attentive, and good weather vs. rainy/snowy/windy weather.

Upon determining the driver-specific thresholds, the ESA system 204 can selectively enable the ESA feature to avoid potential collisions (steering assistance, vehicle braking, etc.). This ESA feature enablement can also be based on other information captured by a set of vehicle perception sensors 232, such as, but not limited to, images from a front-facing camera 236, signals from a radio detection and ranging (RADAR) system 240 and/or a light detection and ranging (LIDAR) system 244, information from a maps/global navigation satellite (GPS) system 248, and measurements from a vehicle speed sensor 252. In other words, while the above-described signals and the driver-specific thresholds are indicative of a driver's aggressiveness and intent to perform evasive steering, these other signals and information can be utilized to determine the degree of ESA provided and whether or not other actions need to be taken as part of the ESA procedure (e.g., vehicle braking in the event that the vehicle 100 is quickly approaching a stationary or moving obstacle.

Figure 3:
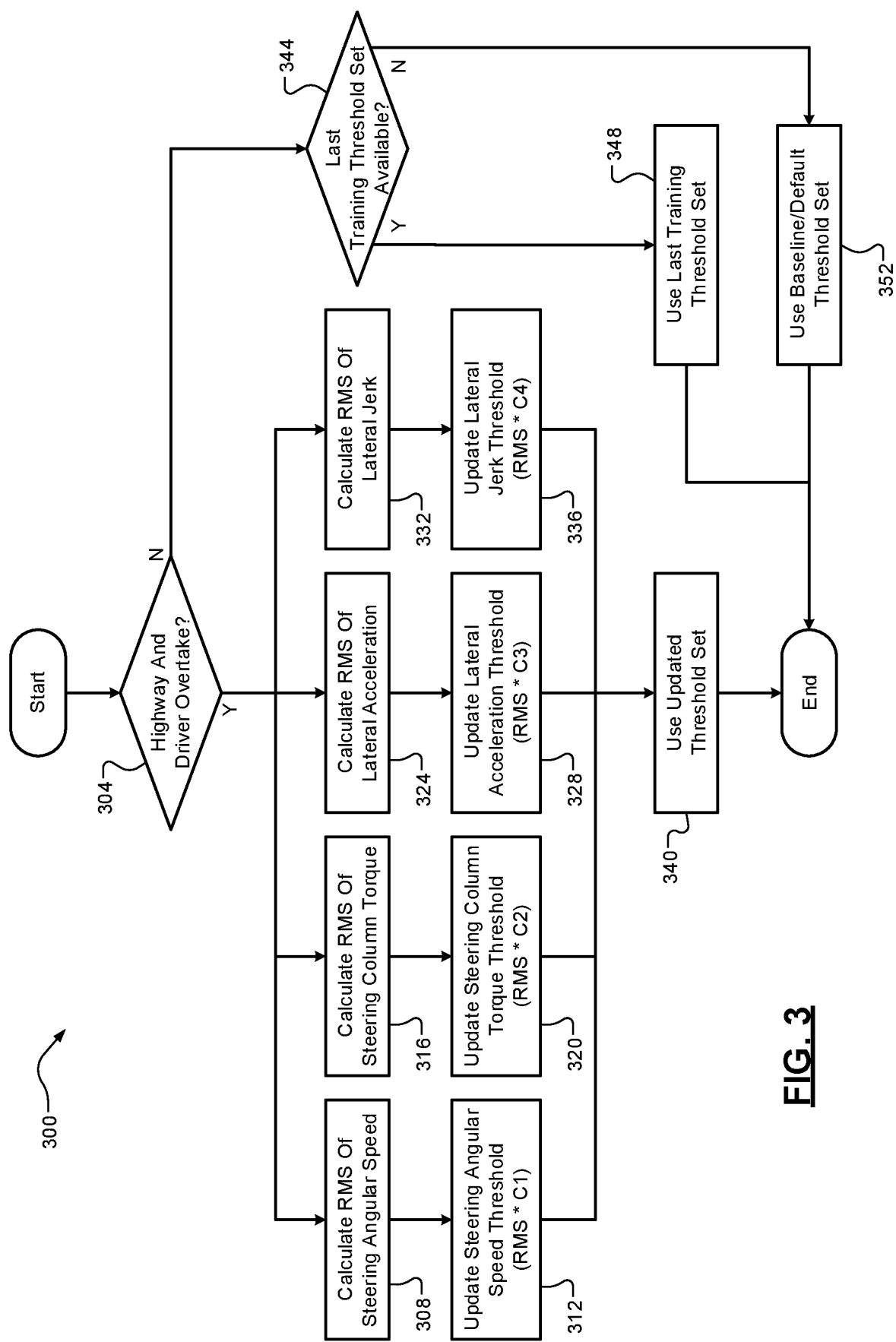
FIG. 3 is a flow diagram of an example method of self-learning-based interpretation of a driver's intent for evasive steering according to the principles of the present disclosure.

Referring now to FIG. 3 and with continued reference to FIGS. 1-2, a flow diagram of an example method 300 of self-learning-based interpretation of a driver's intent for evasive steering according to the principles of the present disclosure is illustrated. While the components of FIGS. 1-2 are specifically referenced herein for illustrative purposes, it will be appreciated that this method 300 could be applicable to any suitable vehicle. At 304, the controller 216 determines whether the vehicle 100 is driving on a highway (e.g., vehicle speed>threshold, map/GNSS data, and the like) and the driver is overtaking control/steering of the vehicle 100 in response to a highway overtake maneuver. When true, the method 300 proceeds to four separate branches to calculate updated thresholds (based on measurements from the steering sensor(s) 228) for the ESA feature of the present disclosure. Otherwise, the method 300 proceeds to 344. In a first branch, at 308 the controller 216 calculates a root-mean-square (RMS) value of the steering angular speed and then updates the threshold value for steering angular speed by multiplying this RMS value by a first calibratable gain (C1) at 312 and the method 300 proceeds to 340. In a second branch, at 316 the controller 216 calculates an RMS value of the steering column torque and then updates the threshold value for steering column torque by multiplying this RMS value by a second calibratable gain (C2) at 320 and the method 300 proceeds to 340. In a third branch, at 324 the controller 216 calculates an RMS value of the lateral acceleration and then updates the threshold value for lateral acceleration by multiplying this RMS value by a third calibratable gain (C3) at 328 and the method 300 proceeds to 340. In a fourth branch, at 332 the controller 216 calculates an RMS value of the lateral jerk and then updates the threshold value for lateral jerk by multiplying this RMS value by a fourth calibratable gain (C4) at 336 and the method 300 proceeds to 340. At 340, the controller 216 uses the updated threshold values for selective engagement/enablement of the ESA feature, and the method 300 then ends or returns to 304. At 344, the controller 216 determines whether a last or previous training threshold value set is available (e.g., in memory). When true, the method 300 proceeds to 348 where the controller 216 uses this last/previous threshold value set for selective engagement/enablement of the ESA feature and the method 300 then ends or returns to 304. When false at 344, the method 300 proceeds to 352 where the controller 216 uses a baseline or default threshold value set (e.g., for an average driver, stored in memory) for selective engagement/enablement of the ESA feature and the method 300 then ends or returns to 304.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An evasive steering assist (ESA) system for a vehicle, the ESA system comprising:
    a set of vehicle perception systems configured to detect an object in a path of the vehicle;
    a driver interface configured to receive steering input from a driver of the vehicle via a steering system of the vehicle;
    a set of steering sensors configured to measure a set of steering parameters; and
    a controller configured to:
    determine a set of driver-specific threshold values for the set of steering parameters;
    compare the measured set of steering parameters and the set of driver-specific threshold values to determine whether to engage/enable an ESA feature of the vehicle;
    determine whether a previous threshold value of the set of driver specific threshold values is available;
    in response to the previous threshold value being available, engage/enable the ESA feature of the vehicle based on the previous threshold value;
    in response to the previous threshold value being unavailable, engage/enable the ESA feature of the vehicle based on a default threshold value; and
    in response to engaging/enabling the ESA feature of the vehicle, command the steering system to assist the driver in avoiding a collision with the detected object.

2. The ESA system of claim 1, wherein the set of steering parameters comprises (i) steering angular speed, (ii) steering column torque, (iii) lateral acceleration, and (iv) lateral jerk.

3. The ESA system of claim 2, wherein the controller is configured to initially determine the set of driver-specific thresholds for the set of steering parameters by multiplying baseline or default threshold values by respective calibratable gains.

4. The ESA system of claim 3, wherein the controller is configured to update the set of driver-specific thresholds for the set of steering parameters by multiplying root-mean-square (RMS) values of the measured set of steering parameters by the respective calibratable gains.

5. The ESA system of claim 4, wherein the controller is configured to update the set of driver-specific thresholds in response to a highway overtake maneuver.

6. The ESA system of claim 5, wherein the controller is configured to initiate the highway overtake maneuver during a safe highway operation scenario.

7. The ESA system of claim 1, wherein the set of perception sensors comprises at least one of (i) a front-facing camera, (ii) a radio detection and ranging (RADAR) system, (iii) a light detection and ranging (LIDAR) system, (iv) a maps/global positioning satellite (GPS) system, and (v) a vehicle speed sensor.

8. An evasive steering assist (ESA) method for a vehicle, the method comprising:
    providing a set of vehicle perception systems configured to detect an object in a path of the vehicle;
    providing a driver interface configured to receive steering input from a driver of the vehicle via a steering system of the vehicle;

providing a set of steering sensors configured to measure a set of steering parameters;

determining, by a controller of the vehicle, a set of driver-specific threshold values for the set of steering parameters;

comparing, by the controller, the measured set of steering parameters and the set of driver-specific threshold values to determine whether to engage/enable an ESA feature of the vehicle;

determining, by the controller, whether a previous threshold value of the set of driver-specific threshold values is available;

in response to the previous threshold value being available, engaging/enabling the ESA feature of the vehicle based on the previous threshold value;

in response to the previous threshold value being unavailable, engaging/enabling the ESA feature of the vehicle based on a default threshold value; and in response to engaging/enabling the ESA feature of the vehicle, commanding, by the controller, the steering system to assist the driver in avoiding a collision with the detected object.

9. The ESA method of claim 8, wherein the set of steering parameters comprises (i) steering angular speed, (ii) steering column torque, (iii) lateral acceleration, and (iv) lateral jerk.

10. The ESA method of claim 9, wherein the controller is configured to initially determine the set of driver-specific thresholds for the set of steering parameters by multiplying baseline or default threshold values by respective calibratable gains.

11. The ESA method of claim 10, wherein the controller is configured to update the set of driver-specific thresholds for the set of steering parameters by multiplying root-mean-square (RMS) values of the measured set of steering parameters by the respective calibratable gains.

12. The ESA method of claim 11, wherein the controller is configured to update the set of driver-specific thresholds in response to a highway overtake maneuver.

13. The ESA method of claim 12, wherein the controller is configured to initiate the highway overtake maneuver during a safe highway operation scenario.

14. The ESA method of claim 8, wherein the set of perception sensors comprises at least one of (i) a front-facing camera, (ii) a radio detection and ranging (RADAR) system, (iii) a light detection and ranging (LIDAR) system, (iv) a maps/global positioning satellite (GPS) system, and (v) a vehicle speed sensor.

15. An evasive steering assist (ESA) system for a vehicle, the ESA system comprising:

means for detecting an object in a path of the vehicle;

means for receiving steering input from a driver of the vehicle via a steering system of the vehicle;

means for measuring a set of steering parameters; and means for:

determining a set of driver-specific threshold values for the set of steering parameters;

comparing the measured set of steering parameters a nd the set of driver-specific threshold values to determine whether to engage/enable an ESA feature of the vehicle;

determining whether a previous threshold value of the set of driver-specific threshold values is available;

in response to the previous threshold value being available, engaging/enabling the ESA feature of the vehicle based on the previous threshold value;

in response to the previous threshold value being unavailable, engaging/enabling the ESA feature of the vehicle based on a default threshold value; and in response to engaging/enabling the ESA feature of the vehicle, commanding the steering system to assist the driver in avoiding a collision with the detected object.

16. The ESA system of claim 15, wherein the set of steering parameters comprises (i) steering angular speed, (ii) steering column torque, (iii) lateral acceleration, and (iv) lateral jerk.

17. The ESA system of claim 16, wherein the means for determining the set of driver-specific threshold values is further for initially determining the set of driver-specific thresholds for the set of steering parameters by multiplying baseline or default threshold values by respective calibratable gains.

18. The ESA system of claim 17, wherein the means for determining the set of driver-specific threshold values is further for updating the set of driver-specific thresholds for the set of steering parameters by multiplying root-mean-square (RMS) values of the measured set of steering parameters by the respective calibratable gains.

19. The ESA system of claim 18, wherein the means for determining the set of driver-specific threshold values is further for updating the set of driver-specific thresholds in response to a highway overtake maneuver.

20. The ESA system of claim 19, wherein the means for determining the set of driver-specific threshold values is further for initiating the highway overtake maneuver during a safe highway operation scenario.

* * * * *